United States Patent Office 3,385,171
Patented May 28, 1968

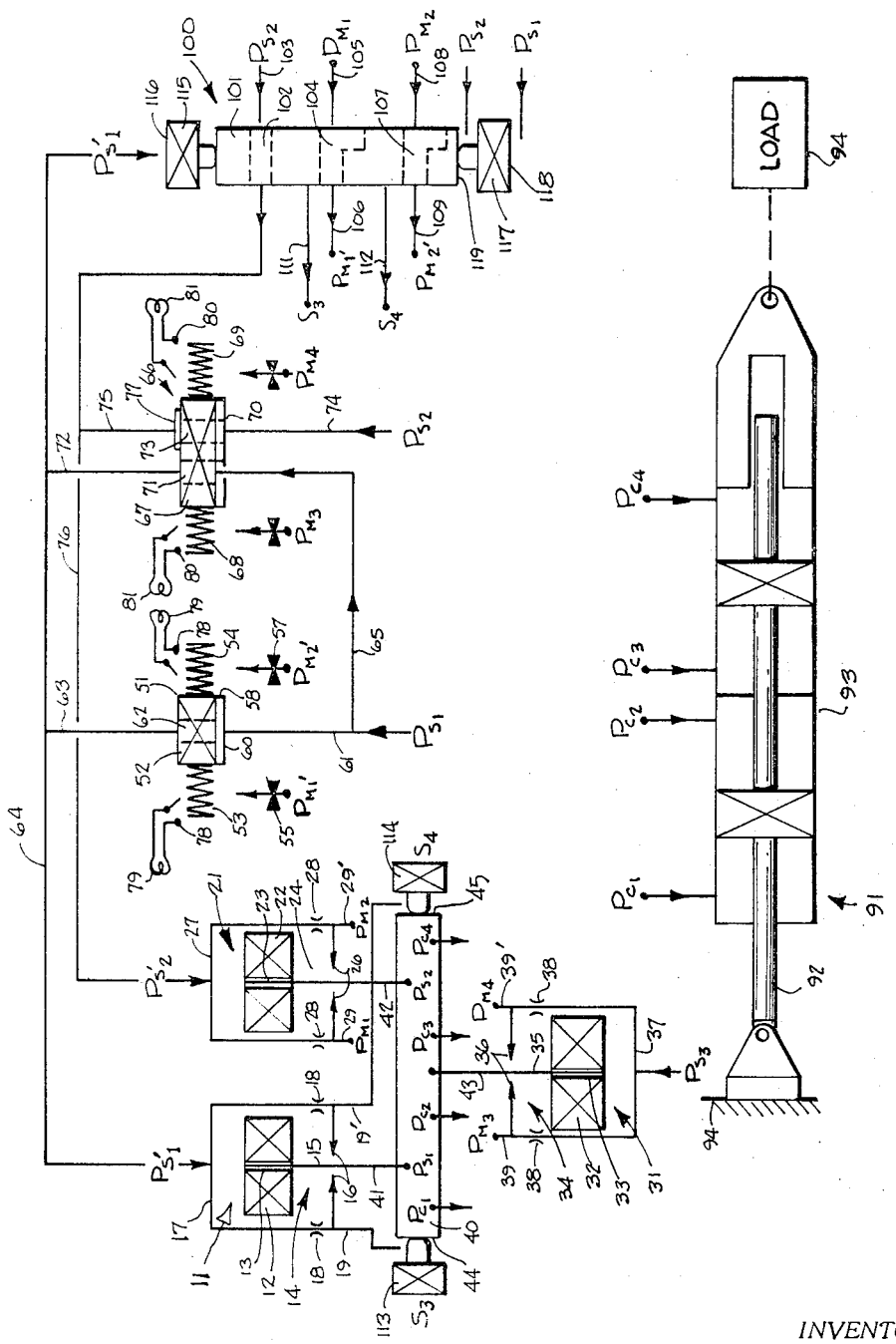

3,385,171
HYDRAERIC REDUNDANT CONTROL SYSTEM HAVING STEADY STATE FAILURE DETECTION CAPABILITY
Derek Wood, Sun Valley, Calif., assignor to Bell Aerospace Corporation, a corporation of Delaware
Filed Dec. 27, 1965, Ser. No. 516,252
7 Claims. (Cl. 91—461)

ABSTRACT OF THE DISCLOSURE

Disclosed is a redundant control system which includes three electro-hydraeric servo valves having common signals applied thereto. One control valve (power valve) is connected to an actuator which in turn is connected to position a load in accordance with the common command signals applied to the servo valve, one of the servo valves having output pressure signals applied to end areas of the control valve for controlling the positioning of the same to in turn control the flow of hydraeric fluid to the actuator as is well known. Each of the servo valves includes a flapper-nozzle combination with a feedback spring connected between the control valve and the flapper. The output signals from the two remaining servo valves are utilized in the system as monitor signals. The monitor signals are connected respectively through restriction orifices to the end areas of slide valves through which hydraeric fluid under pressure is ported. The slide valves have indicators connected thereto (for example, switches which actuate indicator lamps) to provide a signal to an operator that an error has occurred. There is also provided an engage valve through which the flapper-nozzle signal from one of the servo valves may be applied. In the event of a failure of the flapper-nozzle or servo valve which applies the control signals to the control valve, the output signal from this one monitor may be applied to the control valve, thereby to assume the control function of the system.

---

This invention relates generally to redundant control systems and more particularly to such a system for detecting steady state failures and having the further capability, if such is desired, of disabling the failed portion of the system.

As used herein the term "hydraeric" is defined as generic to fluid under pressure and broadly includes hydraulics and pneumatics.

Under certain operating circumstances, in a redundant control system the steady state operating conditions of the redundant control system can be utilized to provide indication of failures within the system. By utilizing such a redundant control system and operating solely upon the steady state conditions thereof, the reliability is increased by eliminating a number of the operating components thereof. In addition thereto the weight of the overall control system is decreased thus adding an additional desirable feature to the control system under many operating conditions.

Accordingly, it is an object of the present invention to provide a hydraeric monitoring and switching apparatus which is capable of detecting steady state system failures within a hydraeric redundant control system.

It is another object of the present invention to provide hydraeric monitoring and switching apparatus which is capable of disabling a detected failed portion of a hydraeric redundant control system.

It is a further object of the present invention to provide hydraeric monitoring and switching apparatus which is adapted to transfer system command function to an operating control channel upon detection of a failure in a predetermined channel of the hydraeric redundant control system.

Additional objects and advantages of the present invention both as to its organization and method of operation may be had by a consideration of the following description taken in conjunction with the accompanying drawing which is presented by way of example only and is not to be taken as a limitation upon the scope of the claims appended hereto and in which:

The single figure represents a schematic illustration of a redundant hydraeric control system having steady state detection capabilities in accordance with the present invention.

A hydraeric redundant control system having steady state failure detection capabilities in accordance with the present invention includes at least three hydraeric valves, each including output pressure signal developing means. A common movable member which is movable in response to a pressure difference in the output signal from one of said valves is interconnected directly to each of the output pressure signal developing means of the three hydraeric valves. A steady state detector means is connected to the remainder of the output pressure signal developing means of the hydraeric valves and is adapted to produce a signal indicative of a failure of a portion of the control system.

Referring now to the drawing, there is therein illustrated three hydraeric valve means 11, 21 and 31. The hydraeric valve means 11 includes a torque motor coils 12 having an armature 13 supported therein which is responsive to electrical signals applied to the torque motor coils 12 to cause movement thereof about a pivot point. The hydraeric valves means includes a pilot or flapper valve 14 which includes as a part thereof a flapper 15 which is an extension of the armature 13. A pair of nozzles 16 are disposed on each side of the flapper 15. A source of pressure $P_{s'1}$ is applied through conduit 17 and restriction orifices 18 to the respective nozzles 16. As the flapper 15 moves between the nozzles 16, a differential in pressure is generated in conduits 19, 19'.

A similar hydraeric valve means is illustrated at 21 and includes the torque motor coils 22 and the armature 23. A flapper valve 24 includes a flapper 25 and the nozzles 26. A source of pressure $P_{s'2}$ is applied through conduit 27 and restriction orifices 28 to the nozzles 26. As the flapper 25 moves between the nozzles 26 a differential pressure is developed in conduit 29, 29', the output pressure from conduit 29 being designated $P_{m1}$ and from 29' being designated $P_{m2}$.

A similar hydraeric valve means is indicated at 31 and includes a torque motor coil 32 and armature 33. A flapper valve means 34 includes a flapper 35 and a pair of nozzles 36. A source of pressure $P_{s3}$ is applied through conduit 37, the restriction orifices 38 and to the nozzles 36. As the flapper 35 moves between the nozzles 36 a differential pressure is developed in conduits 39, 39', the pressure appearing in conduit 39 being designated $P_{m3}$ and in 39' $P_{m4}$.

The flapper 15 is connected by means of a spring member 41 directly to a common movable member such as a spool valve 40. A similar feedback spring 42 interconnects the spool valve 40 to the flapper 25 while still a similar spring 43 interconnects the spool valve 40 to the flapper 35. Thus it is seen that each of the flapper valve means for developing the output differential pressure is directly connected to the common spool valve 40 and moves therewith.

Under normal operating conditions, the output differential pressure appearing in conduits 19, 19' of the hydraeric valve 11 is applied to opposite end areas 44 and 45 of the spool valve 40.

The operation of a hydraeric valve means to cause movement of a spool valve such as that shown at 40 in response to differential pressure signals appearing at opposite ends thereof such as 44 and 45 in response to signals applied as input signals to the valve is well known in the prior art. For example, reference is made to U.S. Patent 2,947,286 and a further detailed discussion of such a valve is not deemed necessary herein.

It should be recognized, however, that in the operation of a hydraeric valve means such as that above described and disclosed that under steady state conditions, i.e., when no command signal is being applied to the valve means to initiate a change of position in the load, that the pressure appearing in the output conduits such as 19, 19', 29, 29', and 39, 39' remain equal, i.e., there is no pressure differential therein during steady state or quiescent conditions. The reason for such steady state non-pressure difference is thoroughly described in Patent 2,947,286. As is therein pointed out, the basic feature is that after a command signal is applied to torque motor coils 12 thus causing the flapper 15 to position itself closer to one of the nozzles 16 than the other, thus producing a differential in pressure in conduits 19, 19', the spool valve 40 immediately moves as thus commanded causing the feedback spring 41 to bring the flapper 15 back to a position wherein it is centered between the nozzles 16. This action occurs quite quickly thus causing the pressure appearing in conduits 19, 19' to return to a non-differential or equal value.

In accordance with the present invention, common input signals are applied to the torque motor coils 12, 22 and 32 thus creating a common command signal to each of the hydraeric valves 11, 21 and 31. Since the flappers 25 and 35 are interconnected by way of feedback springs 42 and 43 respectively to the common spool valve 40, the steady state pressures appearing in conduits 29, 29', and 39, 39' during steady state conditions also remain at zero differential; i.e., the pressures appearing in 29 and 29' are equal and the pressures appearing in conduits 39 and 39' are equal.

It should therefore be seen that under normal operating conditions of a hydraeric valve of the type above described the steady state input and output signals, taking into consideration the various spring constants and the like, are equal. Therefore, if under steady state operating conditions, i.e., no transients being present, a pressure difference between $P_{m1}$, $P_{m2}$ or $P_{m3}$, $P_{m4}$ is detected there has been a failure within the control system. By providing means for comparing each of the signals in three identical channels there is provided apparatus for detecting wherein the failure has occurred. By utilizing the three hydraeric valves all directly connected to a common spool valve such capability is imparted in accordance with the present invention.

Such capability becomes apparent when one considers that if a difference in pressure occurs between $P_{m1}$ and $P_{m2}$ (other than the momentary pressure differential caused by a command signal) then there appears to be a difference between what is being commanded by the hydraeric valve 11 and what is being monitored by the hydraeric valve 21. Similarly, if a difference in pressure occurs between $P_{m3}$ and $P_{m4}$ (other than the momentary pressure differential caused by a command signal) there must therefore be a difference in what is being commanded by the hydraeric valve 11 and what is being monitored by the hydraeric valve 31. By thus applying simple logic, one can detect wherein the failure has occurred, when differences in pressure occur as above pointed out. A further and more detailed explanation of this error detection capability will be set forth hereinbelow.

A steady state error detector means is associated with a hydraeric servo valve and includes a valve means 51 which includes a slide valve 52 properly supported within a cylinder as is well known and which is spring loaded to a central position by springs 53, 54. The pressure $P_{m1'}$ is applied through a restriction orifice 55 to one end area 56 of the slide valve 52. The pressure $P_{m2'}$ is applied through restriction orifice 57 to the opposite end area 58 of the slide valve 52. The prime designation on the pressure $P_{m1}$ and $P_{m2}$ indicates that they have passed through a previous valve means as will be described more fully hereinbelow.

It can be seen that a source of pressure $P_{s1}$ is conducted by means of conduit 61 through a port 62 provided in the slide valve 52 to a conduit 63 which interconnects with an additional conduit 64 which supplies the source of pressure $P_{s1}$ (now $P_{s'1}$) to the hydraeric valve 11. It should further be noted by the symbol 60 that the source of pressure $P_{s1}$ appears completely across the input face of the slide valve 52. It should now be recognized that in the event of a pressure difference of a steady state nature the slide valve 52 translates closing off the communication between port 62 and conduit 63, thus removing pressure $P_{s1}$ from conduit 61. The restriction orifices 55 and 57 interposed between the sources of differential pressure $P_{m1'}$ and $P_{m2'}$ and the end areas 56 and 58 of the slide valve 52 preclude high frequency response by the slide valve 52 thus causing it to be sensitive only to long-term or steady state error signals.

It should also be noted that a conduit 65 is connected to a source of pressure $P_{s1}$ and is connected to a detector means 66 which includes a slide valve 67 supported slidably within a cylinder as is well known in the art. The slide valve 67 includes springs 68 and 69 at opposite ends thereof to center the same within its cylinder. A port 71 is provided which interconnects conduit 65 with a conduit 72 which in turn is connected to the conduit 64 which supplies source of pressure $P_{s1}$ (now $P_{s'1}$) to the hydraeric valve 11. A second port 73 is also provided in the slide valve 67. Port 72 conducts fluid from source $P_{s2}$ thereof which is connected by way of conduit 74 to the entire leading face of the slide valve 67. After passing through the port 73 the source of fluid $P_{s2}$ (now $P_{s'2}$) is conducted by conduit 75 to conduit 76 which conducts source of pressure $P_{s'2}$ to hydraeric valve 21. It will be noted that the orifice 77 to which the conduit 75 is connected on the trailing side of the slide valve 67 overlaps the port 73 by a substantial amount.

It can now be seen that as a steady state (long term) pressure differential occurs between pressures $P_{m1'}$ and $P_{m2'}$ the slide valve 52 translates to cut off the supply of hydraeric fluid to hydraeric valve 11 through the port 62 in the slide valve 52. It should however be noted that the pressure $U_{s1}$ is still supplied through the port 71 in the slide valve 67.

A differential in pressure between $P_{m3}$ and $P_{m4}$ (from hydraeric valve 31) causes slide valve 67 to translate thereby shutting off the supply of fluid from souce of pressure $P_{s1}$ through port 71 to the hydraeric valve 11.

It should be noted that in the event slide valve 52 translates in either direction source of pressure $P_{s1}$ immediately is applied to the exposed end area of the slide valve and causes it to immediately be translated its full extent within its cylinder and locked in that position. A similar relationship occurs with respect to slide valve 67 and source of pressure $P_{s2}$. Such is indicated by the symbol 70 connected to the conduit 74. Means to indicate translation of the slide valves 52 and 67 and therefore the indication of a failure may be provided if such is desired. For example, micro-switches 78 may be utilized to energize indicator lamps 79 connected to appropriate power sources (not shown) while micro-switches 80 would be utilized to energize indicating lamps 81. The indicating lamps 79 and 81 may be located on the operator's control panel, thus providing information to the operator causing him to take appropriate action.

Under similar operating conditions it is desirable to provide additional switching means to transfer actual control of the load to one of the channels normally providing monitoring information.

As above indicated, the hydraeric valve 11 supplies differential pressure to opposite end areas 44 and 45 of the spool valve 40 to thus cause it to translate in response to input signals. Translation of the spool valve 40 causes source of pressure $P_{s1}$ to be supplied through control ports $P_{c1}$ and $P_{c2}$ to one-half of a tandem actuator 91 thus causing a force to be applied to the housing 93 as a result of the rod 92 being grounded as illustrated at 94. Movement of the housing 93 in turn positions a load 94 as desired in accordance with the appropriate input signals. It should also be noted that source of pressure $P_{s2}$ is connected through the common spool valve 40 to output ports $P_{c3}$ and $P_{c4}$ which are in turn connected to the alternative section of the dual actuator 91 as is indicated. Under normal operating conditions however, the ports $P_{c3}$ and $P_{c4}$ may be, if such is desired, bypassed thus providing no power to the actuator 91 although such obviously is not required.

A valve means 100 is applied to effect transfer of control to one of the monitoring channels in the event of a predetermined failure. The valve 100 includes a slide valve 101 having a port 102 therein. The port 102 conducts a source of pressure $P_{s2}$ by way of conduit 103 to conduit 76 which after passing through the port 102 the source of pressure $P_{s2}$ becomes as above indicated $P_{s'2}$. An additional port 104 connects pressure signal $P_{m1}$ by way of conduit 105 to conduit 106 which is connected to the restriction orifice 55 as signal $P_{m1'}$. It should be noted that the input portion of port 104 which is connected to conduit 105 is enlarged as compared to the output portion thereof. A similar port 107 is connected to conduit 108 which conducts pressure signal $P_{m2}$ to conduit 109 which in turn connects the signal $P_{m2'}$ to the restriction orifice 57 associated with the detector 51. Again the input portion of the port 107 is enlarged with respect to the output portion thereof. In addition conduits 111 and 112 are connected as orifices to the cylinder within which the slide valve 101 may translate. Under normal operating conditions, however, conduits 111 and 112 are cut off by the slide valve 101. It should be noted however that the conduits 111 and 112 connect points S3 and S4 to opposite end areas of buttons 113 and 114 which are in direct communication with opposite end areas 44 and 45 of the common spool valve 40.

It should be noted that at the upper end, as viewed in the drawing, of the slide valve 101 there is a button 115 having a large end area 116 to which pressure $P_{s'1}$ is applied. The button 115 is in direct communication with the upper end of the slide valve 101. In direct association and connection with the lower end of slide valve 101 is a button 117 having a smaller end area 118. It should be noted that source of pressure $P_{s2}$ is in direct communication with end area 119 of the slide valve 101 while source of pressure $P_{s1}$ is in direct communication with the end area 118 of the button 117. As a result of the sizing of the various areas of the buttons and slide valves associated with the slide valve 101, the valve is maintained downwardly in the position illustrated in the figure.

To illustrate the operation of the switching capability of the valve means 100 a failure in the hydraeric valve 11 will now be assumed. In the event of such a failure, for example, an open circuit in the torque motor coil 12, the armature 13 does not respond to electrical signals applied to the hydraeric valve 11. Therefore, even though it is commanded to do so, the spool valve 40 does not move. Since the spool valve 40 does not move and the same signals are applied to torque motor coils 22 and 32 the flapper valves 24 and 34 develop output differential pressures at $P_{m1}$ and $P_{m2}$, and $P_{m3}$ and $P_{m4}$ respectively. Since a differential pressure appears at these points and remains there there is an indication of a steady state error, that is the input and output do not agree. Under these conditions, slide valves 52 and 67 translate. Translation of slide valve 52 cuts off source of pressure $P_{s1}$ as does translation of slide valve 67. Thus no pressure appears in conduit 64 which removes pressure from hydraeric valve 11 and simultaneously therewith removes pressure from the face 116 of the button valve 115 associated with the valve means 100. Since pressure $P_{s1}$ and $P_{s2}$ are applied at the lower end of the slide valve 101 and the button 117 the valve moves upwardly as viewed in FIGURE 1. As the valve moves upwardly, the signals appearing at $P_{m1}$ and $P_{m2}$ are applied to conduits 111 and 112 and thus to surfaces S3 and S4 of buttons 113 and 114 associated with the common spool valve 40. Since pressure signals $P_{m1'}$ and $P_{m2'}$ are generated by hydraeric valve 21 it is thus seen that control has been transferred by the detecting and switching means in accordance with the present invention from hydraeric valve 11 to hydraeric valve 21. As above pointed out, source of pressure $P_{s1}$ has locked slide valve 52 in its translated position and source of pressure $P_{s2}$ has locked slide valve 67 in its translated position. However, source of pressure $P_{s2}$ remains applied through port 73 of the slide valve 67 to the conduit 76 thus causing continued operation of the actuator 91 as above described. Although the transfer has occurred as above described and with no degradation in control of the system, an indication of the failure has been given to the operator as above described, and the operator may take appropriate action as may be determined in accordance with any particular application to which the control system may be put.

One skilled in the art with the above description may now be able to discern that in the event of a failure in either the hydraeric valve 21 or the hydraeric valve 31 the respective slide valve 52 or 67 is caused to translate although the valve means 100 remains non-operated. Such is the case because there has been no failure in the normal control channel consisting of hydraeric valve 11 and only an indication of a failure in the monitoring channel 21 or 31 need be transmitted to the operator for appropriate action to be taken.

Thus it can be seen that a redundant hydraeric control system having the capabilities of detecting a steady state failure contained therein has been disclosed in some detail. Furthermore, under certain predetermined operating conditions not only is the system capable of detecting a failure and providing an indication thereof, but of also transferring control from one channel to another without operation degradation.

What is claimed is:

1. In a hydraeric redundant control system having a plurality of control channels for positioning a load in response to input signals, apparatus for detecting a steady state failure in said system, said apparatus comprising:
   (a) at least three hydraeric valve means each including means for developing an output pressure signal responsive to application of an input signal thereto;
   (b) a single movable member movable in response to a variation in pressure in an output pressure signal applied thereto;
   (c) means directly interconnecting said movable member and said output pressure signal from one only of said valve means to move said movable member responsive thereto and thereby to control the flow of hydraeric fluid to position said load responsive to said input signals;
   (d) means directly interconnecting said movable member and said means for developing an output pressure signal in each of said valve means;
   (e) and steady state detector means sensitive only to long term pressure differences in said output pressure signals connected to the remainder of said means for developing output pressure signals, said detector means being insensitive to pressure variations produced responsive to applied input signals, said detector means producing a signal indicative of a failure of a portion of said system.

2. A hydraeric redundant control system as defined in claim 1 in which said means developing an output pressure signal is a flapper valve and said directly interconnecting means is a feedback spring.

3. A hydraeric redundant control system as defined in claim 2 in which said detector means includes switch means for disabling a predetermined valve when a failure associated therewith is detected.

4. A hydraeric redundant control system as defined in claim 3 which further includes valve means connected between the output pressure signal developed by one of said remainder of said flapper valves and said movable member and adapted upon a predetermined failure detection by said detector means to transfer control of said movable member to said one of said remainder of said flapper valves.

5. A hydraeric redundant control system as defined in claim 3 in which said detector means includes first valve means having end areas connected to one of said remainder of said means for developing output pressure signals and second valve means having end areas connected to the other of said remainder of said means for developing output pressure signals.

6. A hydraeric redundant control system as defined in claim 5 in which said switch means is a port defined by each of said first and second valve means.

7. A hydraeric redundant control system as defined in claim 5 which further includes restriction orifices interposed between said means for developing output pressure signals and said end areas of said first and second valve means to render said valve means sensitive only to steady state pressure differential thereacross.

References Cited

UNITED STATES PATENTS

| | | | |
|---|---|---|---|
| 3,190,185 | 6/1965 | Rasmussen | 91—411 |
| 3,240,124 | 3/1966 | Howard et al. | 91—411 |
| 3,257,911 | 6/1966 | Garnjost et al. | 91—365 |
| 3,270,623 | 9/1966 | Garnjost et al. | 91—411 |
| 3,272,062 | 9/1966 | Flippo et al. | 91—411 |

MARTIN P. SCHWADRON, *Primary Examiner.*

B. L. ADAMS, *Assistant Examiner.*